United States Patent

[11] 3,560,825

| | | |
|---|---|---|
| [72] | Inventor | James O. Elliott<br>Xenia, Ohio |
| [21] | Appl. No. | 779,682 |
| [22] | Filed | Nov. 29, 1968 |
| [45] | Patented | Feb. 2, 1971 |
| [73] | Assignee | General Motors Corporation<br>Detroit, Mich.<br>a corporation of Delaware |

[54] CIRCUIT ARRANGEMENT FOR ESTABLISHING AN ENERGIZING CIRCUIT FOR ALTERNATING CURRENT INDUCTION MOTORS
3 Claims, 1 Drawing Fig.

[52] U.S. Cl. .............................................. 318/227,
318/231, 318/293, 318/326
[51] Int. Cl. .............................................. H02p 5/40
[50] Field of Search .......................................... 318/227,
217, 230, 231, 332, 326, 293

[56] References Cited
UNITED STATES PATENTS
| | | | |
|---|---|---|---|
| 3,436,645 | 4/1969 | Johnson et al. ............... | 318/227 |
| 3,346,795 | 10/1967 | Linke ........................ | 318/227 |

*Primary Examiner*—Oris L. Rader
*Assistant Examiner*—K. L. Crosson
*Attorneys*—W. E. Finken and Richard G. Stahr

ABSTRACT: A circuit arrangement for establishing an energizing circuit for alternating current induction motors across a compatible alternating current supply potential source. Two silicon controlled rectifiers, each with a resistor connected across the gate-cathode electrodes thereof, are connected in parallel with each other in an opposite polarity relationship and in series with the motor to be energized and the alternating current input circuit terminals of a full wave diode bridge type rectifier circuit are connected across the silicon controlled rectifiers. Electrical trigger signals produced by an associated control circuit during each potential half cycle of the alternating current supply potential are applied across the negative output terminal of the bridge rectifier circuit and the alternating current input terminals thereof through the respective resistors, in parallel.

PATENTED FEB 2 1971  3,560,825
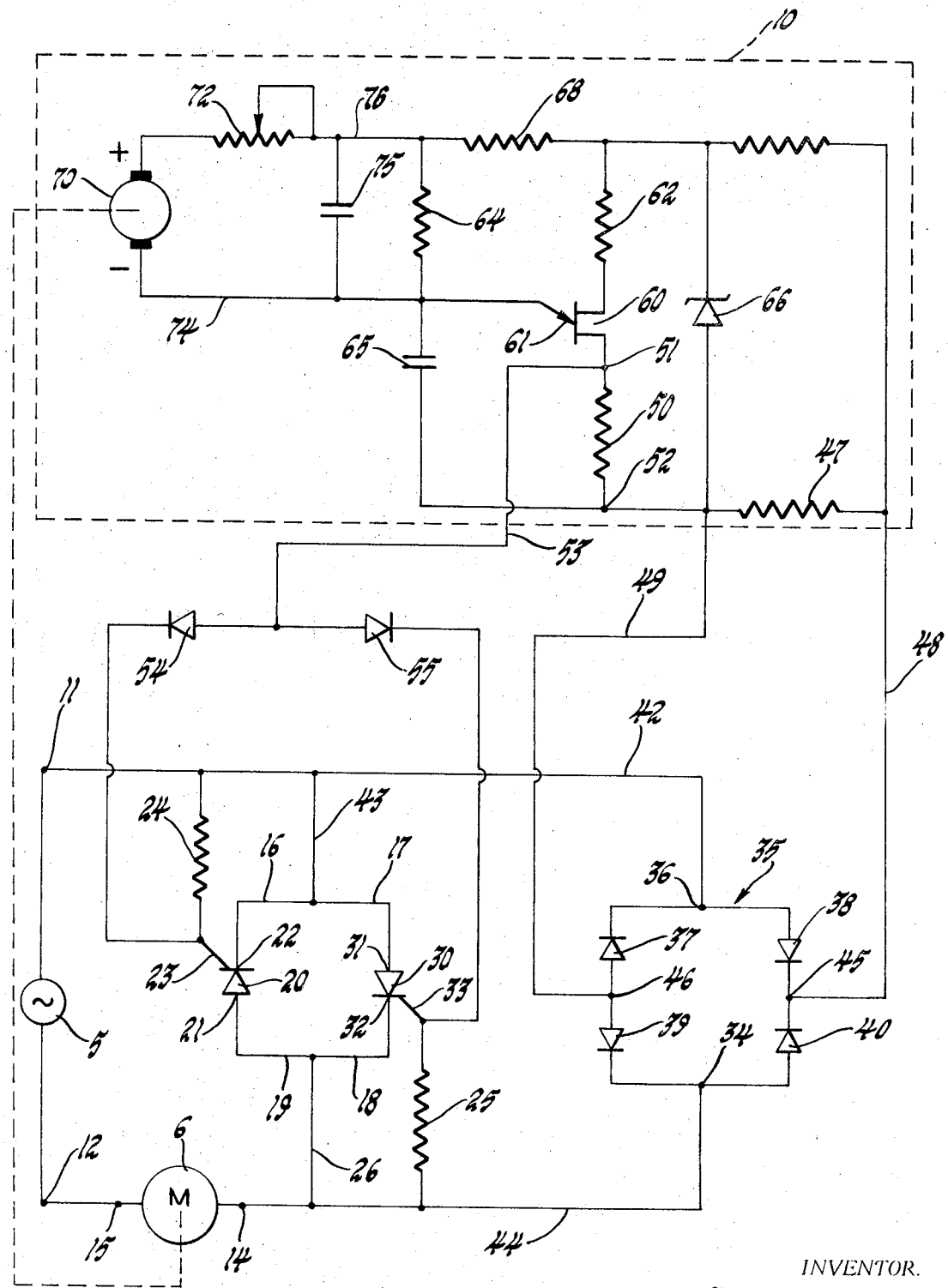
INVENTOR.
James O. Elliott
BY
Richard G. Stahr
ATTORNEY

CIRCUIT ARRANGEMENT FOR ESTABLISHING AN ENERGIZING CIRCUIT FOR ALTERNATING CURRENT INDUCTION MOTORS

The subject invention relates to a circuit arrangement for establishing an energizing circuit for alternating current induction motors across a compatible alternating current supply potential source through parallel connected and oppositely poled silicon controlled rectifiers and, more specifically, to a circuit of this type wherein the trigger signals are resistance coupled to the silicon controlled rectifiers.

To apply a common trigger signal source across the gate-cathode electrodes of parallel connected silicon controlled rectifiers, a pulse transformer having a secondary output winding corresponding to each silicon controlled rectifier has heretofore been required for the purpose of isolating the firing circuit of each silicon controlled rectifier from the firing circuit of every other. As pulse transformers are expensive, a circuit arrangement for resistance coupling a common trigger signal source to parallel connected silicon controlled rectifiers is desirable.

It is, therefore, an object of this invention to provide an improved circuit arrangement for establishing an energizing circuit for alternating current induction motors across a compatible alternating current supply potential source through parallel connected silicon controlled rectifiers.

It is another object of this invention to provide an improved circuit for establishing an energizing circuit for alternating current induction motors across an alternating current supply potential source wherein a common trigger signal source is resistance coupled to parallel connected silicon controlled rectifiers.

In accordance with this invention, a circuit arrangement for establishing an energizing circuit for alternating current induction motors across a compatible alternating current supply potential source through parallel connected and oppositely poled silicon controlled rectifiers is provided wherein a common trigger signal source is resistance coupled across the gate-cathode electrodes of each silicon controlled rectifier.

For a better understanding of the present invention together with additional objects, advantages and features thereof, reference is made to the following description and accompanying single FIGURE drawing wherein the circuit arrangement of this invention is set forth in schematic form.

In the FIGURE, the circuit arrangement for establishing an energizing circuit for an alternating current induction motor across a compatible alternating current supply potential source is set forth in schematic form in combination with a control circuit, generally referenced by the numeral 10, which produces a direct current electrical trigger signal during each potential half cycle of the alternating current supply potential in a manner to be explained in detail later in this specification.

Included in the circuit arrangement of this invention is an input circuit, across which an alternating current supply potential source may be connected, an output circuit, across which an alternating current induction motor to be energized may be connected, first and second silicon controlled rectifiers, each having a resistor connected across the gate-cathode electrodes thereof, connected in parallel with each other in an opposite polarity relationship and in series with the output circuit, a diode bridge type full wave rectifier circuit having two diodes in each the positive and negative polarity bank and the alternating current input circuit terminals thereof connected across the parallel combination of the first and second silicon controlled rectifiers and electrical circuitry for applying the direct current electrical trigger signals produced by the control circuit across the negative output circuit terminal of the bridge rectifier circuit and the alternating current input circuit terminals of the bridge rectifier circuit through the gate-cathode electrode resistors, in parallel.

The input circuit may be terminals 11 and 12 and the output circuit may be terminals 14 and 15. It is to be specifically understood that alternate electrical devices suitable for providing an electrical connection to external circuitry may be employed as the input and output circuits.

An alternating current supply potential source 5 may be connected across input terminals 11 and 12 and an alternating current induction motor 6 to be energized thereby may be connected across output terminals 14 and 15.

Silicon controlled rectifier 20, having an anode electrode 21, a cathode electrode 22 and a gate electrode 23 and a resistor 24 connected across gate electrode 23 and cathode electrode 22, is connected in parallel with another silicon controlled rectifier 30, having an anode electrode 31, a cathode electrode 32 and a control electrode 33 and a resistor 25 connected across gate electrode 33 and cathode electrode 32, in an opposite polarity relationship through leads 16 and 17, which connect the cathode electrode 22 of silicon controlled rectifier 20 to the anode electrode 31 of silicon controlled rectifier 30, and leads 18 and 19, which connect the cathode electrode 32 of silicon controlled rectifier 30 to the anode electrode 21 of silicon controlled rectifier 20. The parallel combination of silicon controlled rectifiers 20 and 30 is connected in series with output circuit terminals 14 and 15 through lead 26.

The alternating current input circuit terminals 36 and 34 of diode bridge type rectifier circuit 35, having two diodes 38 and 40 in the positive polarity bank and two diodes 37 and 39 in the negative polarity bank, are connected across the parallel combination of silicon controlled rectifiers 20 and 30 through leads 42 and 43 and leads 44 and 26, respectively. The positive and negative polarity direct current output circuit terminals 45 and 46, respectively, of bridge rectifier circuit 35 are connected to control circuit 10 through leads 48 and 49 for supplying direct current operation potential therefor. Resistor 47 is connected across direct current output circuit terminals 45 and 46 of bridge rectifier circuit 35 for the purpose of loading the bridge diodes.

It is a well-known characteristic of a solid state diode to conduct current for a few microseconds in a reverse direction immediately subsequent to "turnoff" after it has been conducting in a forward direction. The circuit arrangement of this invention takes advantage of this well-known characteristic to eliminate the requirement of a pulse transformer to trigger parallel connected silicon controlled rectifiers by a common trigger signal source by applying the direct current electrical trigger signals produced by control circuit 10 in a reverse polarity relationship across the conducting diode in the negative polarity bank of bridge rectifier circuit 35 and effectively passing reverse current through this diode while it is conducting in the forward direction, for reasons to be later explained.

To apply the electrical trigger signals produced by control circuit 10 of a positive polarity at output circuit terminal 51 and a negative polarity at output circuit terminal 52 across resistor 50, in a manner to be later explained, in a reverse polarity relationship across the conducting diode in the negative polarity bank of bridge rectifier circuit 35 through the resistor connected across the gate-cathode electrodes of the forward poled silicon controlled rectifier completing a circuit through which the trigger signals will produce current flow in a reverse direction through the diode and in a forward direction through the gate-cathode electrodes of the forward poled silicon controlled rectifier in series to render the forward poled silicon controlled rectifier conductive through the anode-cathode electrodes thereof to complete an energizing circuit for a motor connected across the output circuit, output circuit terminal 51 is connected to alternating current input circuit terminal 36 of the bridge rectifier circuit 35 through lead 53, diode 54, resistor 24 and lead 42 and to the other alternating current input circuit terminal 34 of bridge rectifier circuit 35 through lead 53, diode 55, resistor 25, in parallel with resistor 24, and lead 44 and output circuit terminal 52 is connected to the negative polarity direct current output circuit terminal 46 of bridge rectifier circuit 35 through lead 49.

With the connections shown in the FIGURE, the electrical trigger signals produced by control circuit 10 may be applied in a reverse polarity relationship across diode 37 in the negative polarity bank of bridge rectifier circuit 35 through lead 53, diode 54, resistor 24, lead 42 and alternating current input terminal 36 and through lead 49 or across diode 39 through lead 53, diode 55, resistor 25, lead 44 and alternating current input circuit terminal 34 and through lead 49, depending upon which one of silicon controlled rectifiers 20 or 30 is forward poled upon the occurrence of the electrical trigger signal.

The elements included in the circuits just described which determines across which diode 37 or 39 the electrical trigger signals will be applied in a reverse polarity relationship are diodes 54 and 55.

Over those half cycles of the alternating current supply potential during which input terminals 11 and 12 are of a positive and a negative polarity, respectively, silicon controlled rectifier 30 is forward poled across the anode-cathode electrodes thereof, diode 39 in the negative polarity bank of bridge rectifier circuit 35 is conducting, diode 54 is reverse poled by the source potential applied in a reverse polarity relationship across the anode-cathode electrodes thereof and diode 55 is forward poled by the electrical trigger signals appearing across resistor 50. Over those half cycles of the alternating current supply potential during which input circuit terminals 12 and 11 are of a positive and a negative polarity, respectively, silicon controlled rectifier 20 is forward poled across the anode-cathode electrodes thereof, diode 37 in the negative polarity bank of bridge rectifier 35 is conducting, diode 55 is reverse poled by the source potential applied in a reverse polarity relationship across the anode-cathode electrodes thereof and diode 54 is forward poled by the electrical trigger signals appearing across resistor 50. Therefore, over those half cycles of the alternating current supply potential during which silicon controlled rectifier 30 is forward poled, the electrical trigger signals appearing across resistor 50 are applied in a reverse polarity relationship across conducting diode 39 in the negative polarity bank of bridge rectifier circuit 35 through lead 53, diode 55, resistor 25 and lead 44 and through lead 49 and over those half cycles of the alternating current supply potential during which silicon controlled rectifier 20 is forward poled, the electrical trigger signals appearing across resistor 50 are applied in a reverse polarity relationship across conducting diode 37 in the negative polarity bank of bridge rectifier circuit 35 through lead 53, diode 54, resistor 24 and lead 42 and through lead 49.

The control circuit 10 which produces the electrical trigger signals may be a unijunction transistor-type relaxation oscillator circuit comprising unijunction transistor 60, base resistors 62 and 50 and the series combination of resistor 64 and capacitor 65. Direct current operating potential for control circuit 10 is taken from across Zener diode 66 which is connected across direct current output circuit terminals 45 and 46 of bridge rectifier circuit 35 through leads 48 and 49. Base resistors 62 and 50 and the series combination of resistor 64 and capacitor 65 are connected in parallel across Zener diode 66.

One method of varying the speed of an alternating current induction motor is to vary the electrical conduction angle of each potential half cycle of the alternating current supply potential during which the motor is energized, the greater the electrical conduction angle, the greater the speed of the motor. The electrical trigger signals produced by control circuit 10 trigger silicon controlled rectifiers 20 or 30 conductive to complete an energizing circuit for motor 6 during each potential half cycle of the alternating current supply potential. Therefore, to vary the speed of motor 6, the electrical trigger signals must be produced at the phase angle of each potential half cycle of the alternating current supply potential which will result in a conduction angle over the remainder thereof which will produce the selected speed.

Capacitor 65 begins to charge with the appearance of the diode bridge circuit 35 output potential across Zener diode 66 and unijunction transistor 60 is triggered to conduction to produce an electrical trigger signal across resistor 50 when the charge upon capacitor 65 has reached a magnitude substantially equal to the peak point potential of unijunction transistor 60. To change the conduction angle, therefore, the time required for the charge on capacitor 65 to reach a magnitude substantially equal to the peak point potential of unijunction transistor 60 may be varied.

In capacitor charging circuits, the capacitor will charge substantially exponentially to substantially full potential in a period of time which is substantially equal to four times the time constant of the circuit regardless of the magnitude of the potential to which it is charged. Therefore, the initial substantially linear rate of charge is determined, to a great extent, by the magnitude of the potential charge, the greater the magnitude of the charge, the greater the initial rate. As the potential drop across capacitor 65 determines the magnitude of the charge thereon, the time required for the charge thereon to increase in magnitude to the peak point potential of unijunction transistor 60 may be varied by varying the magnitude of potential drop across capacitor 65.

According to Kirchoff's Second Law, the sum of the potential drops in any complete or closed circuit must equal the sum of the potential rises in that circuit. In applying this law, in tracing through any single circuit, whether it is by itself or a part of a network, a potential drop exists when tracing through a resistance with or in the same direction as the current, or through a battery or generator against their potential, from positive to negative, and a voltage rise exists when tracing through a resistance against, or in a direction opposite to the current, or through a battery or a generator in a direction with their potential, negative to positive.

Considering Zener diode 66 as a potential generator, the sum of the potential drops across resistor 68, across resistor 64, across capacitor 65 and across the resistance of the interconnecting wires must equal the potential rise across Zener diode 66. To reduce the magnitude of the potential across capacitor 65, another potential source may be applied across resistor 64 and poles as shown, whereby this resistor may be considered a potential generator. Tracing through the same loop in the same direction and with a potential applied across resistor 64 poled as shown in the FIGURE, the potential applied across resistor 64 is a potential drop for purposes of Kirchoff's Second Law. As the potential across Zener diode 66 and the values of the components remain substantially constant, any change in magnitude of the potential drop across resistor 64 must be accompanied by a corresponding equal and opposite change in potential drop across capacitor 65 to satisfy Kirchoff's Second Law. Therefore, a variable control potential of a magnitude proportional to motor speed may be applied across resistor 64 to vary the charge rate of capacitor 65 and, consequently, motor speed. As the potential drop across capacitor 65 determines the magnitude of the charge thereon, the initial rate of charge of capacitor 65 and, therefore, the time required for the charge to increase in magnitude to the peak point potential of unijunction transistor 60 may be varied by varying the magnitude of the control potential applied across resistor 64.

One method of producing a control potential which varies with motor speed is an electric tachometer which is driven by the motor shaft and which produces a direct current output potential, the magnitude of which is proportional to motor speed. Commercially available tachometers of this type are small direct current generators which are designed to produce an output direct current potential which increases and decreases linearly with increases and decreases of motor speed. These devices are adapted to be mounted upon the end bell of the motor housing in such a manner that the armature thereof is rotated by the shaft. As electrical tachometers of this type are well known in the art and form no part of this invention, it has been schematically illustrated as a circle in the FIGURE and referenced by the numeral 70. The positive and negative potential output terminals of tachometer 70 are connected across resistor 64 through a potentiometer, generally shown at 72, and lead 74 and lead 76, respectively. Capacitor 75 connected as shunt across resistor 64 tends to smooth the output potential of tachometer 70.

Disregarding the control potential applied across resistor 64, in the relaxation oscillator circuit of control circuit 10, capacitor 65 is charged by the potential appearing across Zener diode 66 through series resistor 64. When the charge upon capacitor 65, which is applied to the emitter electrode 61 of unijunction transistor 60, reaches a magnitude substantially equal to the peak point potential of unijunction transistor 60, this device switches to the low resistance or conducting state. With unijunction transistor 60 in the low resistance or conducting state, capacitor 65 discharges through resistor 50 through the emitter-base junction of unijunction transistor 60. When the potential applied to emitter electrode 61 decreases to a value which is of insufficient magnitude to maintain unijunction transistor 60 conducting as capacitor 65 discharges, the unijunction transistor 60 reverts to its high resistance or nonconducting state and the cycle just described is repeated. When capacitor 65 discharges through resistor 50, electrical trigger signal is produced across resistor 50 which is of a positive polarity at terminal 51 and a negative polarity at terminal 52.

The control potential produced by tachometer 70, which is related to and varies in a magnitude with motor speed and is also selectively variable by adjusting the movable contact of potentiometer 72, is the variable circuit parameter which may be employed for altering the maximum potential to which capacitor 64 may be charged and is, therefore, connected across resistor 64 for the purpose of controlling motor speed.

For any constant motor speed, the magnitude of the control potential and, therefore, the maximum potential to which capacitor 65 may be charged remains constant and an electrical trigger signal is produced across resistor 50 at the same phase angle of each potential cycle of the alternating current supply potential.

Should the movable contact of potentiometer 72 be adjusted in the direction to increase the series resistance of potentiometer 72, the control potential magnitude impressed across resistor 64 decreases in that the control potential produced by tachometer 70 is constant at any constant motor speed. This reduction in magnitude of control potential across resistor 64 results in an increase in magnitude of the potential drop across capacitor 65. The increased potential drop across capacitor 65 also increases the magnitude of the ultimate charge thereacross, a condition which substantially increases the rate of charge of capacitor 65. With this increased charge rate, the charge of capacitor 65 reaches a magnitude substantially equal to the peak point potential of unijunction transistor 60 earlier during each half cycle of the alternating current supply potential, thereby increasing the motor speed because of the increased conduction angle.

Should the movable contact of potentiometer 72 be adjusted in the direction to reduce the series resistance of potentiometer 72, the control potential magnitude impressed across resistor 64 increases. This increase in magnitude of control potential across resistor 64 results in a reduction in magnitude of the potential drop across capacitor 65. The reduced potential drop across capacitor 65 also reduces the magnitude of the ultimate charge thereacross, a condition which substantially reduces the rate of charge of capacitor 65. With this reduced initial charge rate, the charge upon capacitor 65 reaches a magnitude substantially equal to the peak point potential of unijunction transistor 60 later during each half cycle of the alternating current supply potential, thereby reducing the motor speed because of the reduced conduction angle.

The electric trigger signals appearing across resistor 50 of control circuit 10 at any time during those potential half cycles during which input terminals 11 and 12 are of a positive and negative polarity, respectively, and silicon controlled rectifier 30 is forward poled across the anode-cathode electrodes thereof are applied in a reverse polarity relationship across the anode-cathode electrodes of conducting diode 39 in the negative polarity bank of bridge rectifier circuit 25 through the circuit which may be traced from positive polarity terminal 51 through diode 55, resistor 25, lead 44 and alternating current input circuit terminal 34 and from negative polarity terminal 52 through lead 49 and direct current output circuit terminal 46 to extinguish conducting diode 39. As conducting diode 39 extinguishes, a circuit is completed through which the electrical trigger signals will produce current flow in a reverse direction through diode 39 and in a forward direction through the gate-cathode electrodes of forward poled silicon controlled rectifier 30 which may be traced from positive polarity terminal 51 of control circuit 10 through lead 53, diode 55, the gate-cathode electrode of forward poled silicon controlled rectifier 30, lead 44, alternating current input circuit terminal 34 of bridge rectifier 35, diode 39 conducting in a reverse direction, direct current output circuit terminal 46 and lead 49 to negative polarity terminal 52 of control circuit 10.

This current flow triggers forward poled silicon controlled rectifier 30 conductive through the anode-cathode electrodes thereof to complete an energizing circuit for motor 6 across alternating current potential source 5 over the remainder of the half cycle during which input terminals 11 and 12 are of a positive and negative polarity, respectively.

The electric trigger signals appearing across resistor 50 of control circuit 10 at any time during those potential half cycles during which input terminals 12 and 11 are of a positive and negative polarity, respectively, and silicon controlled rectifier 20 is forward poled across the anode-cathode electrodes thereof are applied in a reverse polarity relationship across the anode-cathode electrodes of conducting diode 37 in the negative polarity bank of bridge rectifier circuit 35 through the circuit which may be traced from positive polarity terminal 51 through diode 54, resistor 24, lead 42 and alternating current input circuit terminal 36 and from negative polarity terminal 52 through lead 49 and direct current output circuit terminal 46 to extinguish conducting diode 37. As conducting diode 37 extinguishes, a circuit is completed through which the electrical trigger signals will produce current flow in a reverse direction through diode 37 and in a forward direction through the gate-cathode electrodes of forward poled silicon controlled rectifier 20 which may be traced from positive polarity terminal 51 of control circuit 10 through lead 53, diode 54, the gate-cathode electrode of forward poled silicon controlled rectifier 20, lead 42, alternating current input circuit terminal 36 of bridge rectifier 35, diode 37 conducting in a reverse direction, direct current output circuit terminal 46 and lead 49 to negative polarity terminal 50 of control circuit 10.

This current flow triggers forward poled silicon controlled rectifier 20 conductive through the anode-cathode electrodes thereof to complete an energizing circuit for motor 6 across alternating current potential source 5 over the remainder of the half cycle during which input terminals 12 and 11 are of a positive and a negative polarity, respectively.

While a preferred embodiment of the present invention has been shown and described, it will be obvious to those skilled in the art that various modifications and substitutions may be made without departing from the spirit of the invention.

I claim:

1. A circuit arrangement for establishing an energizing circuit for an alternating current induction motor across a compatible alternating current supply potential source comprising in combination with a control circuit which produces a direct current electrical trigger signal during each potential half cycle of the alternating current supply potential; input circuit means across which an alternating current supply potential source may be connected; output circuit means across which an alternating current induction motor to be energized may be connected; first and second silicon controlled rectifiers each having anode, cathode and gate electrodes connected in parallel with each other in an opposite polarity relationship and in series with said output circuit means; a diode bridge type full wave rectifier circuit having two diodes in each the positive and negative polarity bank and the alternating current input circuit terminals thereof connected across said parallel combination of said first and second silicon controlled rectifiers; a resistor connected across the said gate-cathode electrodes of each of said first and second silicon controlled rectifiers and means for applying the said direct current electrical trigger signals produced by said control circuit across said negative output circuit terminal of said bridge rectifier circuit and the said alternating current input circuit terminals of said bridge rectifier circuit through respective resistors in parallel.

2. A circuit arrangement for establishing an energizing circuit for an alternating current induction motor across a compatible alternating current supply potential source comprising in combination with a control circuit which produces a direct current electrical trigger signal during each potential half cycle of the alternating current supply potential; an alternating current supply potential source connected across associated input circuit means and a motor to be energized connected across associated output circuit means; first and second silicon controlled rectifiers each having anode, cathode and gate electrodes connected in parallel with each other in an opposite polarity relationship and in series with said motor to be energized; a diode bridge type full wave rectifier circuit having two diodes in each the positive and negative polarity bank and the alternating current input circuit terminals thereof connected across said parallel combination of said first and second silicon controlled rectifiers for supplying a direct current potential for said control circuit, a resistor connected across the said gate-cathode electrodes of each of said first and second silicon controlled rectifiers and means for applying the said direct current electrical trigger signals produced by said control circuit in a reverse polarity relationship across the conducting diode in said negative polarity bank of said bridge rectifier circuit through the said resistor connected across the said gate-cathode electrodes of the forward poled said silicon controlled rectifier to complete a circuit through which said trigger signals will produce current flow in a reverse direction through said diode and in a forward direction through said gate-cathode electrodes of said forward poled silicon controlled rectifier in series to render said forward poled silicon controlled rectifier conductive through the said anode-cathode electrodes thereof to complete an energizing circuit for said motor connected across said associated output circuit means.

3. A circuit arrangement for establishing an energizing circuit for an alternating current induction motor across a compatible alternating current supply potential source comprising in combination with a control circuit which produces a direct current electrical trigger signal during each potential half cycle of the alternating current supply potential across positive and negative output circuit terminals thereof; input circuit means across which an alternating current supply potential source may be connected; output circuit means across which an alternating current induction motor to be energized may be connected; first and second silicon controlled rectifiers each having anode, cathode and gate electrodes; means for connecting said silicon controlled rectifiers in parallel with each other in an opposite polarity relationship; means for connecting said parallel combination of said first and second silicon controlled rectifiers in series with said output circuit means; a diode bridge type full wave rectifier circuit having two diodes in each the positive and negative polarity bank, alternating current input circuit terminals and positive and negative output circuit terminals for supplying a direct current potential for said control circuit, means for connecting said alternating current input circuit terminals of said bridge rectifier circuit across said parallel combination of said first and second silicon controlled rectifiers; first and second diodes; a resistor connected across the gate-cathode electrodes of each of said first and second silicon controlled rectifiers and means for connecting said positive output circuit terminal of said control circuit to one of said alternating current input circuit terminals of said bridge rectifier circuit through one of said diodes and one of said resistors in series and to the other one of said alternating current input circuit terminals of said bridge rectifier circuit through the other one of said diodes and the other one of said resistors in series and means for connecting said negative polarity output circuit terminal of said control circuit to said negative output circuit terminal of said bridge rectifier circuit.